(12) United States Patent
Mekuria et al.

(10) Patent No.: US 11,218,784 B1
(45) Date of Patent: Jan. 4, 2022

(54) METHOD AND SYSTEM FOR INSERTING MARKERS IN A MEDIA PRESENTATION

(71) Applicant: Codeshop, B.V., Amsterdam (NL)

(72) Inventors: Rufael Negatu Mekuria, Amsterdam (NL); Arjen Wagenaar, Amsterdam (NL); Dirk Griffioen, Arnhem (NL)

(73) Assignee: CodeShop, B.V., Amsterdam (NL)

( * ) Notice: Subject to any disclaimer, the term of this patent is extended or adjusted under 35 U.S.C. 154(b) by 0 days.

(21) Appl. No.: 17/301,662

(22) Filed: Apr. 9, 2021

(51) Int. Cl.
  H04N 21/84    (2011.01)
  H04N 21/845   (2011.01)
  H04N 21/43    (2011.01)

(52) U.S. Cl.
  CPC ..... *H04N 21/8456* (2013.01); *H04N 21/4305* (2013.01); *H04N 21/84* (2013.01); *H04N 21/8455* (2013.01)

(58) Field of Classification Search
  CPC ........... H04N 21/8456; H04N 21/4305; H04N 21/84; H04N 21/8455
  See application file for complete search history.

(56) References Cited

U.S. PATENT DOCUMENTS

| | | | |
|---|---|---|---|
| 9,520,079 B2 | 12/2016 | Fernandes et al. | |
| 2016/0182923 A1* | 6/2016 | Higgs | H04N 21/23424 725/34 |
| 2017/0310722 A1 | 10/2017 | Chen | |
| 2018/0262549 A1 | 9/2018 | Giladi | |
| 2019/0132630 A1* | 5/2019 | Loheide | H04L 65/4076 |
| 2019/0174161 A1 | 6/2019 | Skupin | |
| 2019/0281100 A1 | 9/2019 | Lo | |
| 2020/0275148 A1* | 8/2020 | Stockhammer | H04N 21/26241 |

OTHER PUBLICATIONS

ISO/IEC 23009-1: Draft Third Edition Jul. 26, 2018 Information technology—Dynamic adaptive streaming over HTTP (DASH)—Part 1:Media presentation description and segment formats.
ISO/IEC 14496-12: Fifth edition Dec. 15, 2015 Information technology—Coding of audiovisual objects—Part 12: ISO base media file format.
ISO/IEC 23000-19:2018 Information technology—Multimedia application format (MPEG-A)—Part 19: Common media application format (CMAF) for segmented media.
ANSI/SCTE 214-1 2016 MPEG DASH for IP-Based Cable Services Part 1: MPD Constraints and Extensions Society of Cable Telecommunications Engineers, Inc., Exton, PA, USA.

* cited by examiner

*Primary Examiner* — Thai Q Tran
*Assistant Examiner* — Jose M Mesa
(74) *Attorney, Agent, or Firm* — Pablo Meles

(57) ABSTRACT

A method, system and apparatus receives input content to an interface of a streaming system, detects a SCTE-35 marker corresponding to an injection point, inserts at least one or more EventStream Elements in an MPEG-DASH media presentation, inserts at least one or more MPEG-DASH Events in the MPEG-DASH media presentation, and publishes an MPEG-DASH media presentation description at least an announce time before an estimated time corresponding to the injection point of the SCTE-35 marker. The method and system further transmit one or more MPEG-DASH Events carried in the MPEG-DASH Presentation to one or more client devices and cause the presentation of the encoded content of the MPEG-DASH media presentation and of supplemental content.

20 Claims, 9 Drawing Sheets

Cloud Environment 300

Cloud Environment with Unified Origin and a Live Encoder

400

```
<Period id="1516" start="PT448357H8M48.000S">
<EventStream schemeIdUri="urn:scte:scte35:2014:xml+bin" timescale="1" presentationTimeOffset="1614085728">
<Event presentationTime="1614085728" duration="19" id="758">    <Signal xmlns="http://www.scte.org/schemas/35/2016">    <Binary>/DAgAAAAAAAAAP/wDwUAAAL2f//+ABoXsMAAAAAAAFO7Jwo=</Binary>    </Signal>    </Event>
</EventStream>
<AdaptationSet>
...
</AdaptationSet>
<AdaptationSet>
...
</AdaptationSet>
</Period>
```

METHOD AND SYSTEM FOR INSERTING MARKERS IN A MEDIA PRESENTATION

CROSS-REFERENCE TO RELATED APPLICATIONS

Not Applicable.

STATEMENT REGARDING FEDERALLY-SPONSORED RESEARCH OR DEVELOPMENT

Not applicable

INCORPORATION BY REFERENCE

Not applicable

FIELD OF THE INVENTION

The teachings in accordance with the exemplary embodiments relate generally to streaming media, and more particularly to the insertion of markers in media presentations.

DESCRIPTION OF THE RELATED ART

This section is intended to provide a background or context to the various embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Content in digital format is increasingly popular, users are often downloading or streaming such content from a remote service. Because different users or client devices require the content to be in specific formats, the remote service will often perform tasks such as video encoding, packaging and generating an MPEG-DASH media presentation description. Such remote service may be implemented as a streaming system. For streaming video, a provider will often want to designate places where advertising or other supplemental content should be placed relative to the playback of the video content, such as between scenes or at the beginning of a particular segment or point. In conventional approaches, an upstream generator will place a marker in the stream with a time stamp corresponding to the video frame before the alternate content should be displayed. Systems can detect this marker and provide notification at a determined amount of time before that frame is rendered for playback, in order to provide sufficient time to determine and/or render the alternate content for display. In some situations, however, the markers are placed at, or very close to, the video frame in the playback such that there is insufficient time to ready the supplemental content for display. The nature of event signalling in MPEG-DASH format further creates issues when attempting to insert and playback such advertising or other supplemental content.

SUMMARY

In an exemplary embodiment, a system and method for insertion and carriage of markers in MPEG-DASH is disclosed. Markers are inserted into MPEG-DASH presentations to identify opportunities for insertion or replacement with alternate content to be provided in place of the primary content of a media presentation. The alternate content can be any appropriate content, as may relate to promotional or information or commercial advertisement content relevant in some way to the primary content or a viewer of the primary content. A marker such as a SCTE-35 message can be inserted in an MPEG-DASH presentation. The marker can be carried in an MPEG-DASH manifest file as a media presentation description (MPD) Event or in a media segment.

In an exemplary embodiment, the method comprises detecting the SCTE-35 marker in the input content, generating a corresponding MPEG-DASH Event, which comprises an optional step of base64 encoding, deriving a duration, presentation time and unique identifier from the original marker. In case the original marker contains more than one segmentation descriptor with different duration, more than one corresponding MPEG-DASH Events are generated corresponding to each descriptor. The MPEG-DASH manifest file can be re-published with the MPD Event corresponding to the marker, and when received, the marker can provide sufficient notice to prepare the replacement content to be displayed at the injection point by delaying the announcement of segments in the MPEG-DASH media presentation description. The MPEG-DASH media presentation description, when received, also provides segmentation information of the content to allow a decisioning on the replacement or insertion of alternate content. In some embodiments, the segmentation information is displayed to the user through a User Interface. In another embodiment the segmentation information is used to do dynamic ad insertion or replacement and pass the MPEG-DASH media presentation description to one or more additional client devices. In some embodiments the segmentation information is used to do a client-side ad insertion/replacement and display the alternate/rendered content.

In some embodiments, a computer-implemented method receives input content to an interface of a streaming system, detects a SCTE-35 marker corresponding to an injection point, inserts at least one or more EventStream Elements in an MPEG-DASH media presentation, and inserts at least one or more MPEG-DASH Events in the MPEG-DASH media presentation, the duration of the one or more MPEG-DASH Events corresponding to a duration determined by parsing the SCTE-35 message. The method further includes publishing an MPEG-DASH media presentation description at least an announce time before an estimated time corresponding to the injection point of the SCTE-35 marker and transmitting the one or more MPEG-DASH Events carried in the MPEG-DASH Presentation to one or more client devices, where the one or more client devices are enabled to detect the inserted SCTE-35 marker during presentation of an encoded content of the MPEG-DASH media presentation and cause supplemental content to be presented.

In some embodiments, a system includes at least one or more processors and memory including instructions that, when executed by the system, cause the system to perform the operations of receiving input media content to an interface of a streaming system, determining an injection point of a video portion of the input media content, determining a return point of a video portion of the input media content and a segmentation duration, and inserting one or more MPEG-DASH Events in an MPEG-DASH media presentation where the system publishes an Event presentation time matching a time of the injection point in the media presentation description, at a time corresponding to an announce time of at least 4 seconds before a corresponding media segment. The instructions when executed further cause the system to transmit the MPEG-DASH media presentation via one or more electronic devices to be received by an electronic device.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 8 illustrates exemplary steps involved with the disclosed methods for inserting markers in MPEG-DASH in accordance with the embodiments.

DETAILED DESCRIPTION

Figure 1:
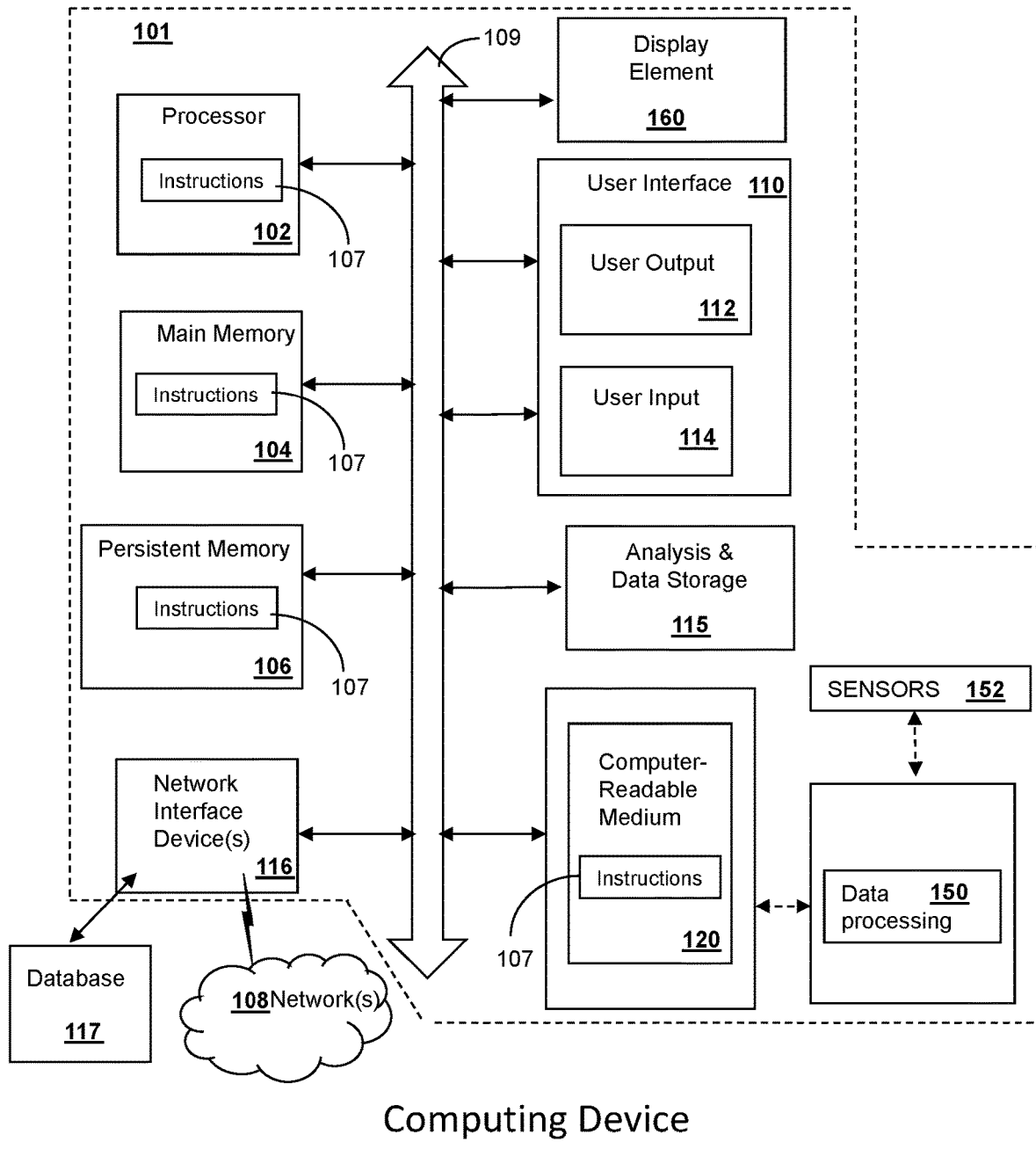
FIG. 1 illustrates an example computational architecture for implementing a client device for receiving and requesting MPEG-DASH streams, or resources used to deploy an MPEG-DASH packaging and encoding system in accordance with the embodiments.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Furthermore, although the methods may be described in a particular order, the order in which the steps are performed can be modified within contemplation of scope of the embodiments.

The nature of Event Signalling in MPEG-DASH imposes certain requirements to avoid messages from getting lost, by for example the insertion of a duplicate identifier, or by not reserving enough time to announce a marker. The embodiments herein disclose techniques for encapsulating SCTE-35 messages in the MPEG-DASH manifest or in MPEG-DASH segments that allows clients to transparently identify content segmentation. To insert markers in MPEG-DASH, signals designed to be carried in MPEG-2 Transport streams have to be carried in the ISO base media file format or in the MPEG-DASH manifest descriptors and clients have to be able to interpret the information to 1. Have enough time to apply a content replacement 2. Determine the nature of the insertion opportunity 3. Determine the time of the insertion slot and 4. Enable updates of the replacement such as termination or update to be detected.

Approaches described and suggested herein relate to the authoring of MPEG-DASH media presentations, such as by packaging and encoding systems, and publication of streaming manifests. In particular, various embodiments provide for the insertion and coding of markers, such as SCTE-35 markers, into the MPEG-DASH media presentation description or media segments at locations sufficient to provide a determined amount of pre-roll time before supplemental content is to be provided in place of the primary content of the media file. Other embodiments provide for the signalling of MPD events as defined by SCTE-214 that are derived from SCTE-35 messages allowing unique identification of content segmentation information, and replacement of advertisement slots. Although not necessarily limited to such, the supplemental content can be any appropriate content, as may relate to promotional or information content relevant in some way to the primary content or a viewer of the primary content. A marker inserted as according to a communication standard, such as a SCTE-104 message or as a SCTE-35 messages, can be received with the media input to an MPEG-DASH encoding and packaging system, and can be translated to an 1MPD Event in the manifest presentation description during the packaging process. The streams can be buffered by an amount corresponding to a determined pre-announce time such that the SCTE-35 marker, when received to the packaging or encoding system, while the inserted marker can immediately be published in the media presentation description (MPD) or in a media segment. When received by the client device presenting the media stream, the SCTE-35 marker in the MPEG-DASH media presentation description or media segment can be detected with sufficient time to prepare the supplemental content to be displayed at the corresponding injection point.

Various other such functions can be used as well within the scope of the various embodiments as would be apparent to one of ordinary skill in the art in light of the teachings and suggestions contained herein.

The injection point is a time point in a media stream or content where supplemental content can be inserted or the stream can be replaced. In many cases the injection point can be signalled through a SCTE-35 marker such as using the splice_insert or time_signal commands that signal the start of a break. An out point typically is used to allow splicing out of the network, i.e. inserting a supplemental/replacement content, while an in point typically refers to returning to the main network feed.

For example, FIG. 1 depicts an exemplary diagrammatic representation of a machine in the form of a computer system 100 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein with one or more processors either co-located or not.

Various embodiments of the present disclosure can be implemented on an information processing system or computing device. The information processing system is capable of implementing and/or performing any of the functionality set forth herein. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, smart phones, microprocessor-based systems, set top boxes, programmable consumer electronics, network PCs, minicomputer systems, mainframe computer systems, Internet-enabled television, and distributed cloud computing environments that include any of the above systems or devices, and the like. The information processing systems contemplated herein include media streaming devices such as smart televisions, tablet computers, personal computers, media streaming servers, content delivery networks or other components with similar functionality for transmitting, receiving and processing of media streaming content. The media streaming device can also include a parser device which can include a device such as a file reader, java-script based parser, that can extract the ISO Base Media file Format structures to read them into the computer memory and use them for generating instructions for the processor. Again, a media streaming device as contemplated in various embodiments herein can be any device dealing with streaming media either actively or passively. They could be origin servers or packagers that are used for formatting live encoded media, or alternatively embedded in devices such as smart phones, televisions, iPads, or other consumer electronics receiving the track for rendering the media presentation, TV Channel or any other associated media tracks. As noted previously, the data processing can be any number of data processing techniques suited for the identifying, enclosing, storing, transmitting, receiving, formatting, converting, multiplexing, de-multiplexing, slicing, presenting, providing controlled access or authentication, tracking, logging or counting or any other function contemplated herein in any setting or environment.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described herein.

According to yet another embodiment of the present disclosure, a computer readable storage medium comprises computer instructions which, responsive to being executed by one or more processors, cause the one or more processors to perform operations as described in the methods or systems above or elsewhere herein.

As shown in FIG. 1, an information processing system 101 of a system or computing device 100 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 109, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 100. The data processing module 150 can be coupled to one or more sensors 152 as needed. Such sensors can be timers, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 100, can use the information from the history log such as in the analysis process and in making decisions related to methods disclosed herein.

The computer readable medium 120, according to the present example, can be communicatively coupled with a reader/writer device (not shown) that is communicatively coupled via the bus architecture 109 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 100 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 2-9 illustrate examples of systems, data formats, methods or process flows, according to various embodiments of the present disclosure, which can operate in conjunction with the information processing system or computing device 100 of FIG. 1.

Figure 2:
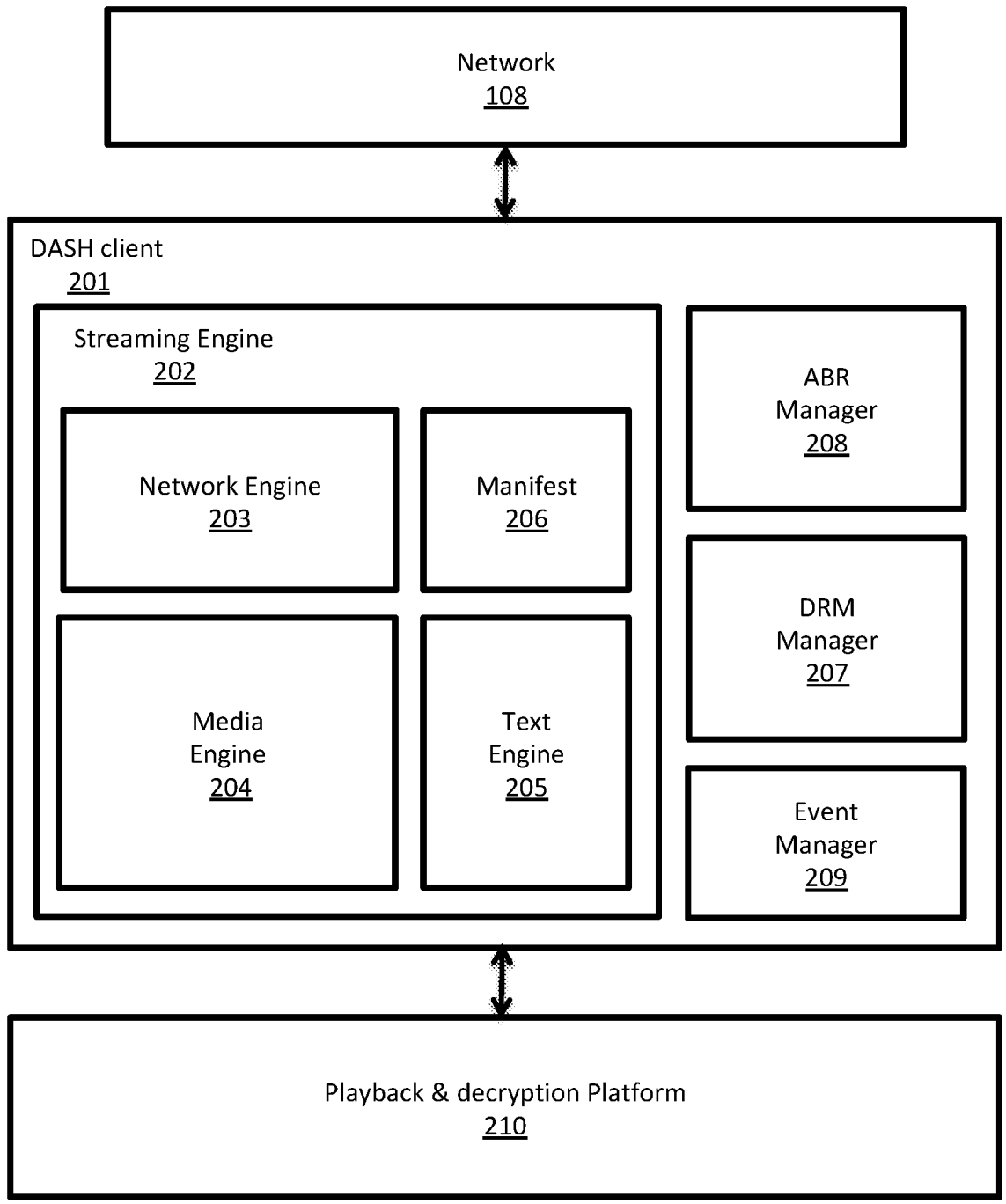
FIG. 2 illustrates the architectural components of a client receiving and requesting an MPEG-DASH stream in accordance with the embodiments.

FIG. 2 illustrates an example DASH client implementation in an environment or system 200 as used in several embodiments. A network 108 can be used by the DASH client 201 to receive data such as following HTTP requests. Most notably the DASH client 201 keeps track of a streaming manifest 206, and a streaming engine 202 can possess a network engine 203 for making requests for segments and other HTTP(S) requests and a media engine 204 for managing media segments and pushing them to playback at playback and decryption platform 210. The platform 210 can be part of the DASH client 201 or separate. The streaming engine 202 can further include a text engine 205 responsible for fetching and rendering text tracks such as tracks based on WebVTT or TTML or other popular subtitle formats such as CEA 608/708. An ABR Manager 208 is responsible for ABR logic such as choosing and selecting bit-rates from adaptation sets in order to achieve high quality playback without stalling for example. A DRM Manager 207 is responsible for fetching license keys and potentially decryption keys for playback of content on the playback and decryption platform 210. Common implementations include Shaka player as developed by Google or dash.js as developed by the DASH industry forum, where many other similar implementation and commercial implementations exists possessing similar functionality. An Event Manager 209 is responsible for handling stream events, in HLS or HTTP Live Streaming, these could be DATE-RANGE tags, or in MPEG-DASH these could be inband events as defined by the DASHEventMessageBox, or 1MPD Events signalled by an EventStream Element and Event Element in the MPEG-DASH media presentation description. The Event manager 209 is responsible for dispatching events either to applications or to other entities.

The syntax of a splice_info_section( ) that is carried in a SCTE-35 marker is shown below. Each row indicates the field name and number of bits followed by the type, as per SCTE-35 2019 as published by American national standards institute (ANSI). The fields of the markers can be parsed by parsing the binary bit-stream according to interpreting the byte order of the syntax elements. The syntax elements (fields) are used when parsing the marker, and are referred throughout this text as such. For example, the splice_event_id is a field carried in the splice_insert command that can be included with the splice_info_section. The field names if used in these embodiments are referring to this syntax as specified by the SCTE-35 communication standard, such as for example SCTE-35 2019. A duration in a SCTE-35 marker as used herein may refer to the segmentation_duration carried in a segmentation_descriptor or a break_duration as signalled in splice_insert command. In different parts of the disclosure SCTE-35 duration, break_duration( ) and segmentation_duration may be used interchangeably, as typically a SCTE-35 marker carried in an MPEG-DASH presentation will carry one or more of these.

```
splice_info_section( ) {
    table_id 8 uimsbf
    section_syntax_indicator 1 bslbf
    private_indicator 1 bslbf
```

-continued

```
            reserved 2 bslbf
            section_length 12 uimsbf
            protocol_version 8 uimsbf
            encrypted_packet 1 bslbf
            encryption_algorithm 6 uimsbf
        pts_adjustment 33 uimsbf
        cw_index 8 uimsbf
        tier 12 bslbf
        splice_command_length 12 uimsbf
        splice_command_type 8 uimsbf E
        if(splice_command_type == 0x00)
            splice_null( ) E
        if(splice_command_type == 0x04)
            splice_schedule( ) E
        if(splice_command_type == 0x05)
            splice_insert( ) E
        if(splice_command_type == 0x06)
            time_signal( ) E
        if(splice_command_type == 0x07)
            bandwidth_reservation( ) E
        if(splice_command_type == 0xff)
            private_command( ) E
        descriptor_loop_length 16 uimsbf E
        for(i=0; i<N1; i++)
            splice_descriptor( ) E
        for(i=0; i<N2; i++)
            alignment_stuffing 8 bslbf E
        if(encrypted_packet)
        E_CRC_32 32 rpchof E
        CRC_32 32 rpchof
        }
```

The syntax of the splice_insert( ) command is shown below as per SCTE-35 standard, the syntax elements and fields referenced herein are as specified in SCTE-35 2019 or later versions.

```
    splice_insert( ) {
    splice_event_id 32 uimsbf
    splice_event_cancel_indicator 1 bslbf
    reserved 7 bslbf
    if(splice_event_cancel_indicator =='0') {
        out_of_network_indicator 1 bslbf
    program_splice_flag 1 bslbf
    duration_flag 1 bslbf
    splice_immediate_flag 1 bslbf
    reserved 4 bslbf
    if((program_splice_flag == '1') && (splice_immediate_flag == '0'))
        splice_time( )
    if(program_splice_flag == '0') {
        component_count 8 uimsbf
    for(i=0;i<component_count;i++) {
        component_tag 8 uimsbf
        if(splice_immediate_flag == '0')
        splice_time( )
    }
    }
    if(duration_flag == '1')
    break_duration( )
    unique_program_id 16 uimsbf
    avail_num 8 uimsbf
    avails_expected 8 uimsbf
    }
    }
```

The syntax of a time_signal command is illustrated below as defined in ANSI/SCTE-35.

```
    time_signal( ) {
        splice_time( )
    }
```

The table illustrates the syntax of a segmentation_descriptor as used herein referring again to SCTE-35 2019 or later versions, the fields include segmentation_event_id, an identifier for a segmentation event. Segmentation_duration flag should be set to 1 and a segmentation_duration should be present if the segmentation is used for the content insertion as in this invention.

```
    segmentation_descriptor( ) {
        splice_descriptor_tag 8 uimsbf
        descriptor_length 8 uimsbf
        identifier 32 uimsbf
        segmentation_event_id 32 uimsbf
        segmentation_event_cancel_indicator 1 bslbf
        reserved 7 bslbf
        if(segmentation_event_cancel_indicator == '0') {
        program_segmentation_flag 1 bslbf
        segmentation_duration_flag 1 bslbf
        delivery_not_restricted_flag 1 bslbf
        if(delivery_not_restricted_flag == '0') {
        web_delivery_allowed_flag 1 bslbf
        no_regional_blackout_flag 1 bslbf
        archive_allowed_flag 1 bslbf
        device_restrictions 2 bslbf
        }else {
        reserved 5 bslbf
        }
        if(program_segmentation_flag == '0') {
        component_count 8 uimsbf
        for(i=0;i<component_count;i++) {
        component_tag 8 uimsbf
        reserved 7 bslbf
        pts_offset 33 uimsbf
        }
        }
        if(segmentation_duration_flag == '1')
        segmentation_duration 40 uimsbf
        segmentation_upid_type 8 uimsbf
        segmentation_upid_length 8 uimsbf
        segmentation_upid( )
        segmentation_type_id 8 uimsbf
        segment_num 8 uimsbf
        segments_expected 8 uimsbf
        if(segmentation_type_id == '0X34' ||
        segmentation_type_id == '0X36') {
        sub_segment_num 8 uimsbf
        sub_segments_expected
        }
        }
    }
```

Figure 3:
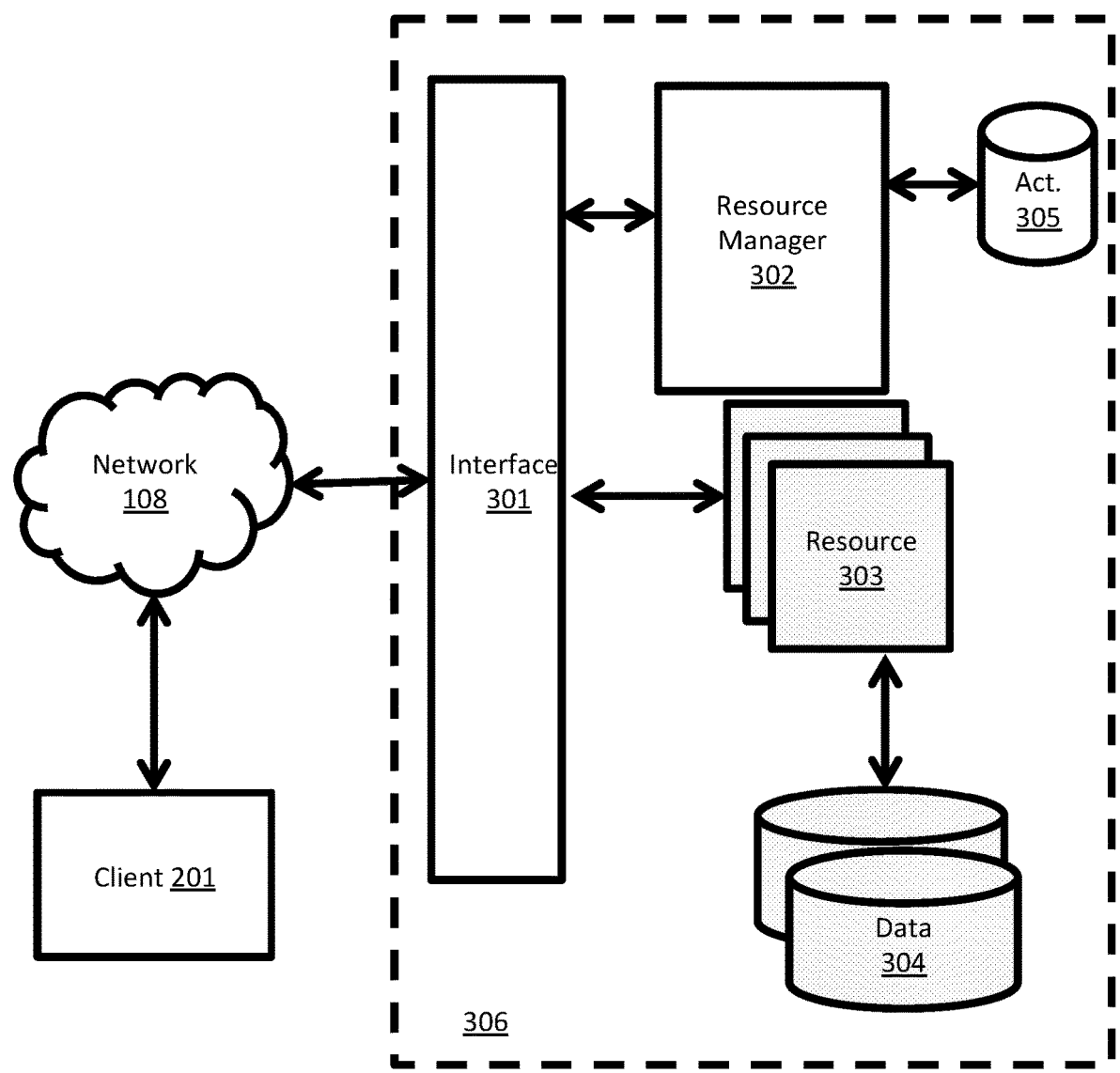
FIG. 3 illustrates an example computational environment for deploying a packaging and encoding system, using shared computational resources, such as cloud computing in accordance with the embodiments.

FIG. 3 illustrates an example environment 300 in which aspects of the various embodiments can be implemented. In this example a user is able to utilize a client device 201 to submit requests across at least one network 108 to a resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The network 108 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources of one or more types. These types can include, for example, application servers operable to process instructions provided by a user or database servers operable to process data stored in one or more data stores 303 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 303 can submit a request that is received to an interface layer 301 of the provider environment 306. The interface layer can include application programming interfaces (APIs) or other exposed interfaces enabling a user to submit requests to the provider environment. The interface layer 301 in this example can also include other components as well, such as at least one Web server, routing components, load balancers, and the like. When a request to provision a resource is received to the interface layer 301, information for the request can be directed to a resource manager 302 or other such system, service, or component configured to manage user accounts and information, resource provisioning and usage, and other such aspects using an account database 305 for example. A resource manager 302 receiving the request can perform tasks such as to authenticate an identity of the user submitting the request, as well as to determine whether that user has an existing account with the resource provider, where the account data may be stored in at least one data store 304 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 201 to communicate with an allocated resource without having to communicate with the resource manager 302, at least until such time as a relevant aspect of the user account changes, the user is no longer granted access to the resource, or another such aspect changes.

The resource manager 302 (or another such system or service) in this example can also function as a virtual layer of hardware and software components that handles control functions in addition to management actions, as may include provisioning, scaling, replication, etc. The resource manager 302 can utilize dedicated APIs in the interface layer 301, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 301 in at least one embodiment includes a scalable set of customer-facing servers that can provide the various APIs and return the appropriate responses based on the API specifications. The interface layer 301 also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
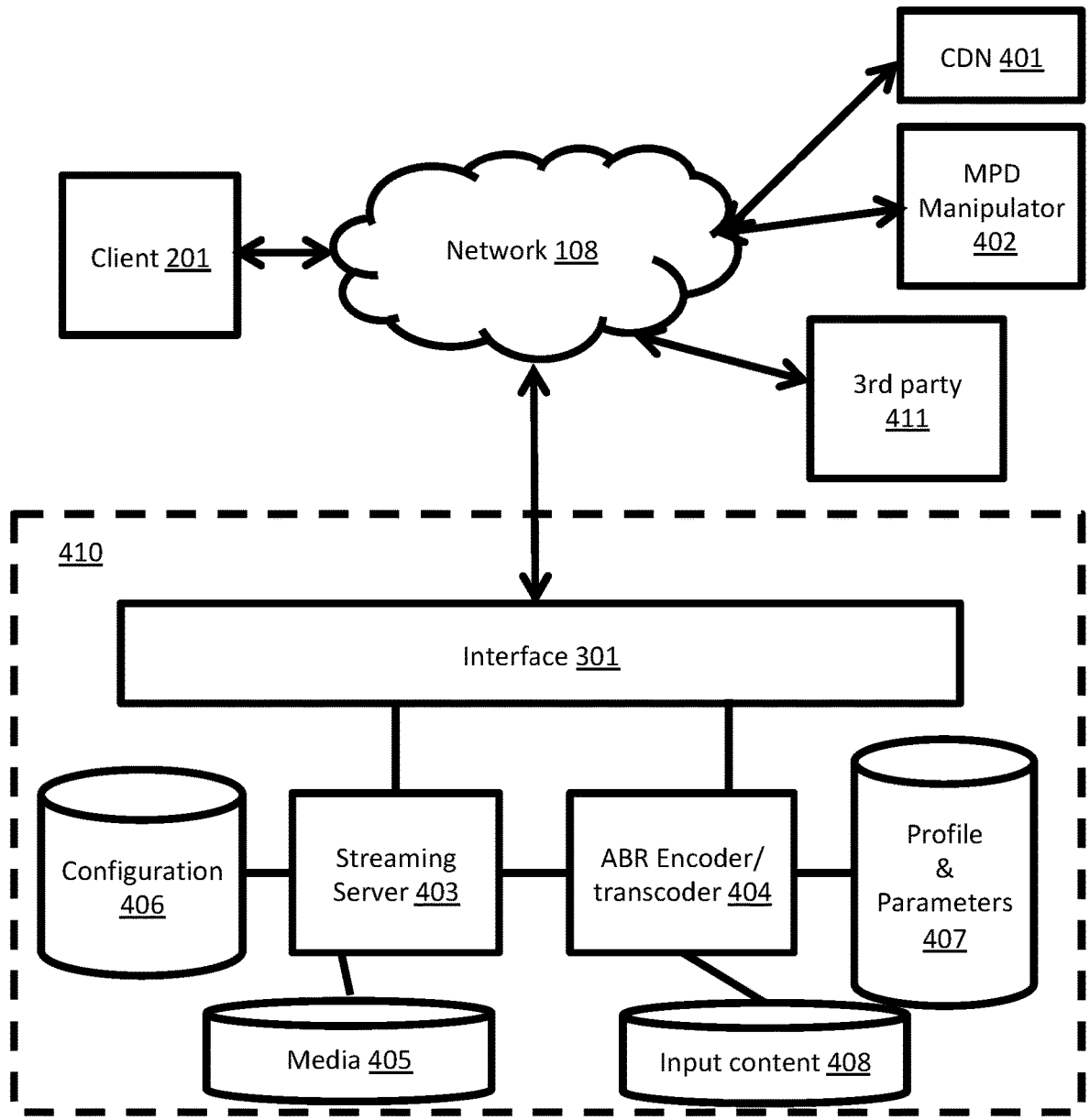
FIG. 4 illustrates an example subsystem for managing media file packaging, encoding and streaming server for MPEG-DASH that can be utilized in accordance with various embodiments.

FIG. 4 illustrates an example system 400 that can be used to implement aspects of the various embodiments, in an electronic environment such as that discussed with respect to FIG. 3. In the system 400 of FIG. 4, a client computing device 201 can submit a request for content across at least one network 108 to be received by a content provider environment or system 400. As mentioned, in at least some embodiments the request can include a request for content to be displayed on the computing device 100 of FIG. 1 or other client devices, and in many cases will include video or other media content that is encoded for presentation on the client device 201. The network(s) 108 can include any appropriate network, such as the Internet, a local area network (LAN), a cellular network, an Ethernet, or other such wired and/or wireless network. A content provider environment 410 can include any appropriate resources for providing content from a resource provider, as may include various servers, data stores, and other such components known or used for providing content from across a network (or from the "cloud"). As mentioned elsewhere herein, the client computing device 201 can be any appropriate computing or processing device, as may include a desktop or notebook computer, smartphone, tablet, wearable computer (i.e., smart watch, glasses, or contacts), set top box, or other such system or device. An interface layer 301, when receiving a request or call, can determine the type of call or request and cause information to be forwarded to the appropriate component or sub-system. For example, a request for content might be forwarded to a streaming server 403 while a request to specify encoding parameters might be forwarded to an Adaptive Bitrate Streaming (ABR) Encoder 404, among other such options. These calls or requests can also come from third parties, although third party providers 411 can also provide at least some of the media content to be stored to a media repository 405 and encoded for display on the client device 201 as discussed herein.

In one example, an interface layer 301 of the environment 410 receives a call. As known for network environments, the interface layer 301 can include components such as interfaces (e.g., APIs), load balancers, request and/or data routers, and the like. If the request is a request for content, such as for a video data stream to be provided to the client device 201, information for the request can be directed to one or more streaming servers 403, which can obtain the content from a media data store 405 or other such repository to be sent back across the network(s) to the computing device In at least some embodiments a request from an operator, an administrator, a client device 201, a third party provider 411, or another such source might include a request to specify one or more sets of encoding parameters to be used with a media file. Accordingly, information regarding the encoding parameters can be provided to a ABR Encoder 404, or other such component or service, that is able to receive the information through an appropriate interface (i.e., an API or console) and cause the profile and parameter data to be stored to appropriate repositories 407 as discussed elsewhere herein. When a request for a video file is received, the streaming server 403 can use the profile and parameter data to determine the appropriate encoding information, and can pass that to one or more ABR encoders 404, which can obtain the media file from media data store 405 (or from input content 408) and encode the media file per the encoding information, which can then be provided to the client device by the streaming server 403 or other such component.

In some embodiments the encoding subsystem includes one or more encoders, a set of bitstreams (or video signals), and a content delivery network. The one or more encoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN) 401. The bitstreams can represent various encoded/packaged versions of the signal feed, as may be encoded per the encoding parameters from the ABR Encoder 404. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 2 seconds of video or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN 401 may reduce an amount of storage needed at each node of the CDN. The CDN 401 itself may include a network of computers (e.g., servers). Each of the computers of the CDN 401 can function as a node, and the CDN 401 can store and/or deliver the bitstreams over a wide-area network (e.g., the Internet).

A streaming server 403 can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN 401. For example, the signal request may be an HTTP request for the origin server to send digital data to one of the client devices. The signal response may represent a data response from the origin server to be forwarded by the CDN 401 to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The streaming server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN 401). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN 401 until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The streaming server may be configured to perform a content invalidation. For example, one or more of the content segments may be invalidated. Content invalidation may prevent and/or stop content from being delivered to the client devices. Invalidation may be configured by the operator using expiry modes and time shift buffer depth configuration. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN 401. For example, the client device may request the manifest file and when the TTL value expires for the cached manifest in the various nodes of the CDN 401, the updated manifest file (e.g., the invalidated manifest) may be distributed throughout the CDN 401 to the client device.

A change in video stream may be initiated by a user in one example. In other cases, it may be necessary to change a stream due to low quality. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example media presentation description can include various data, such as a file extension, metadata, and/or pointers/links. The data can be human-readable or coded using an encoded format, an encrypted format and/or computer readable (e.g., binary) format. Popular formats in communication standards include the MPEG-DASH media presentation description (MPD) defined in ISO 23009-1 by MPEG and the HTTP Live Streaming manifest defined in RFC 8216 defined by IETF (internet engineering task force).

The format of the data in the manifest file may be varied according to the design criteria of a particular implementation. The file extension can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. The format of the pointers may be varied according to the design criteria of a particular implementation. The pointers of the manifest file can point to the respective content segments. The content segments in some embodiments can be implemented as Common Media Application Format (CMAF) segments as defined by ISO/IEC in 23000-19. For example, the content segments may comprise data conforming with the Common Media Application Format (CMAF). In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

As mentioned, in many situations a content provider will want to inject supplemental content, or take other such actions, at specific locations in the presentation of a streaming media presentation based on MPEG-DASH as based on ISO/IEC 23009-1 or HLS defined in RFC 8216. This can include, for example, injecting advertising breaks at specific locations in a video feed, such as between segments or at the beginning of a portion of the playback. Content providers in some embodiments can receive content over inputs such as serial digital interface (SDI) inputs, where the content can include messages such as SCTE-104 or SCTE-35 messages that indicate the appropriate locations for these breaks. It should be understood, however, that other types of messages and communication standards can be used as well within the scope of the various embodiments. SDIs are digital media interfaces that can support various video resolutions, frame rates, three-dimensional content, and other types of media. SDIs typically transmit uncompressed, unencrypted digital video signals, and can be used for packetized data. In a cloud-based environment, for example, an encoding system can utilize SMPTE-2022 to send digital video over an IP network using a video format such as SDI. An SDI port in at least some embodiments will only allow for one component or process to read from the port at any given time. Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs), electronic data processing (EDP) interfaces, user datagram protocol (UDP) inputs, or high-definition multimedia inputs (HDMIs), can be monitored using such processes as well.

In some embodiments, when a track formatted as CMAF Track according to MPEG CMAF as defined in ISO/IEC 23000-19 is available as input to the packager/origin or encoding system, messages are already encapsulated as SCTE-35 markers in timed metadata track or in DASHEventMessage Boxes (as indicated by the abbreviation emsg). In this case, packager/origin or encoding system may use some of the disclosed methods to convert SCTE-35 markers to MPEG-DASH markers.

In various implementations, upstream generators will place the marker for a break, action point, or injection point in the stream at the same time code or location, relative to the video frame, where the break, action point, or injection should occur. The injection can include the addition of alternative content while the remaining media content playback is paused, while an action can include starting another channel or selecting additional content to be presented during playback, among other such options. While many conventional approaches provide for some amount of preroll time, or provide the marker at a determined point prior in the stream to where the action or injection should occur, some providers provide little to no pre-roll time such that there can be issues with enabling the supplemental content (e.g., advertising or related content) to be ready to display at the appropriate time during playback.

Accordingly, approaches in accordance with various embodiments can attempt to encode appropriate injection information into the stream itself in order to allow for sufficient time to enable the supplemental content to be determined, prepared, and/or otherwise ready to display at the determined injection point. In some embodiments, a streaming media service can consume the SDI input, or other appropriate media interface input, which can have markers such as SCTE-104 markers (per the standards set forth by the Society of Cable Telecommunications Engineers) that indicate locations for the injection of supplemental content, such as advertising. SCTE-104 messages are often received in input from sources such as regional broadcasting systems and used for the automated insertion of commercials. The service can ensure that an instantaneous decoder refresh (IDR) frame occurs at the point for the injection. An IDR frame is a type of I frame using in MPEG-4 encoding that designates that frames following the IDR frame may not refer back to, or build from, frames occurring in the stream before the IDR frame. In some embodiments, the detection of an IDR frame can also cause the contents of a reference picture buffer to be cleared out. Subsequent frames can then be encoded or decoded without reference to the any frame prior to the IDR frame.

According to the example process, a received SCTE-104 message can be converted or translated to a SCTE-35 message that can be passed with the video content as part of the transport stream. In some processes, SCTE-35 messages might be received with the input content. The SCTE-35 messages received on the transport stream can identify every insert event, action point, or injection point. SCTE messages also can provide for confidentiality and protection against the unauthorized insert of commercials or advertising by third parties intercepting the stream. SCTE-104 messages typically are generated directly before the insertion points. The encoding of a SCTE-35 message in the MPEG-DASH media presentation description by the origin packager server, however, enables the message to be placed at an appropriate point in the stream to allow for a sufficient amount of pre-roll time, as may be specified by the user or otherwise determined. When the media data arrives at a transport stream muxer (multiplexer) or other such component, approaches in accordance with various embodiments can allow for the application of a pull-up time on the SCTE-35 message relative to the video content. The SCTE-35 message can contain the same data internally, but can be moved up (or to a prior location relative to playback) by a specified amount of pull-up time based at least in part upon the program clock reference (PCR). The PCR can be the encoder clock count sent to synchronize the encoder clock, and can be used as the reference time when the video content is multiplexed in at least some embodiments. In at least some embodiments, the video content is buffered in the multiplexer, or mux, just prior to the interleave scheduler by the amount of the pull-up value. Such buffering can, however, result in a corresponding increase in latency of the encoded output through the pipeline.

In some embodiments the SCTE-35 message fields are used to generate the MPD Events to be inserted in the MPEG-DASH streaming manifest. This comprises using the splice_event_id from the SCTE-35 marker, as present in the splice_insert command, as an event identifier of the Event (Event@id) or a CRC-32 checksum of the SCTE-35 marker.

In case of time_signal, instead, the value of id should be set to the CRC-32 checksum or another hash or checksum of the SCTE-35 marker that results in a 32 bit value. Setting Event@id to a corresponding value, and a base 64 encoding of the binary SCTE-35 message carried in the value space of the Event Element in the MPEG-DASH manifest, deriving the MPEG-DASH Event presentation time of the event by converting the time_splice and program clock reference time PCR and presentation time stamp PTS or in case splice_immediate flag is 1 only the PCR and PTS and PTSadjust field. In preferred embodiments timing relative to Unix Epoch is used, that is number of seconds since 00:00:00 1-1-1970 as to have a universal time anchor for events. In some embodiments, an MPD Manipulator 402 can be setup by a third-party ad insertion provider or a dynamic ad insertion provider as further explained with respect to FIG. 5.

Deriving the duration and inserting it as Event@duration field. In case one or more segmentation descriptors exist then one or more corresponding Events are inserted in the MPEG-DASH media presentation description with corresponding matching durations. In this case a checksum providing a unique 32 bit value should be used as the id field in the MPD event, such as a CRC32 checksum of the SCTE-35 marker. The ABR Encoder 404 would be receiving input content to an interface of a streaming system. The step of detecting a SCTE-35 marker corresponding to an injection point is important for identifying an insertion point of an MPD Event. In such case the ABR encoder or streaming server will be inserting zero or one EventStream Element in an MPEG-DASH media presentation containing zero or more MPEG-DASH Events. The duration of the one or more MPEG-DASH Events would always be corresponding to the duration determined by parsing the SCTE-35 message. In a next step the ABR encoder of streaming server would be publishing the one or more MPEG-DASH Event Elements and the EventStream Element in an MPEG-DASH media presentation description at least the announce time before the estimated time corresponding to the injection point of the SCTE-35 marker. The following step would include ttransmitting the one or more MPEG-DASH Events carried in the MPEG-DASH Presentation to one or more client devices, where the client devices are enabled to detect the inserted SCTE-35 marker during presentation of the encoded content and cause supplemental content to be presented.

In preferred embodiments, the ABR encoder 404 or streaming server 403 would also be embedding the one or more MPEG-DASH Events as inband DASHEventMessageBoxes in an MPEG-DASH media segment with an earliest presentation time under the injection time minus the defined announce time and the message_data field enclosing the SCTE-35 message; Transmitting the MPEG-DASH media segment to the client. These are DASHEventMessageBoxes 'emsg' as defined in MPEG-DASH ISO/IEC 23009-1 and also adopted in ISO/IEC 23000-19 (CMAF)

Another step applied by streaming server or ABR encoder 404 comprises detecting that the SCTE-35 marker contains more than one segmentation descriptors. In this case the ABR encoder 404 or streaming server 403 would be inserting the one or more MPEG-DASH Events each corresponding to a single segmentation descriptor with a different duration; The id of each event computed as a hash or checksum of the SCTE-35 marker message.

In preferred embodiments the ABR encoder 404 or streaming server 403 would also be embedding the one or more MPEG-DASH Events as one or more MPD Events in an MPEG-DASH media presentation description; The duration of the one or more 1MPD Events corresponding to the duration or planned duration (segmentation duration is set and segmentation_duration flag is set to 1) carried in the SCTE-35 marker. in Setting the @contentEncoding attribute of the EventStreamElement to base64; Setting the schemeIdUri attribute of the EventStreamElement to urn:scte:scte-35:bin:2013 and setting the EventStreamElement attribute @presentationTimeOffset to a value matching the start time of an enclosing MPEG-DASH Period are also common steps to align the timing to the timing relative to epoch at 1-1-1970 or at least enable a global timescale.

The ABR Encoder 404 or streaming server 403 may also be triggering the client to update the manifest presentation description by triggering an MPD validity Expiration Event. In some embodiments, the streaming server 403 or ABR encoder 404 may be detecting that the SCTE-35 marker has a cancel_indicator set to 1. In this case, if the Event with corresponding splice_event_id is not published in a segment or manifest it can still be removed from the media presentation description. In case a emsg.id or splice event id was identical to a previously received SCTE-35 marker or a currently active 1MPD Events; Detecting that the message payload is matching, the ABR encoder 404 or streaming server 403 would be inserting zero (no new) MPD Events in the MPEG-DASH media presentation description.

In preferred instantiations the Streaming server is receiving the input content as one of a CMAF Timed Metadata Track, an MPEG-2 Transport stream, a smooth streaming timed metadata track or an MPEG-DASH presentation or an HLS presentation.

In an exemplary computer implemented method, the method can include first detecting a SCTE-104 marker in the media content corresponding to the injection point; and translating the SCTE-104 marker to the SCTE-35 marker.

The ABR Encoder 404 is always ensuring that a fragment boundary is introduced at the time point corresponding to the injection point for all media segments in the MPEG-DASH media presentation. To convert MPEG-2 TS timing, the ABR encoder 404 or streaming server 403 analyzes a program clock reference (PCR) corresponding to the injection point computing a presentation time stamp based on the presentation time in the transport stream corresponding to the injection time. This new timestamp is typically based on a well-defined anchor.

Figure 5:
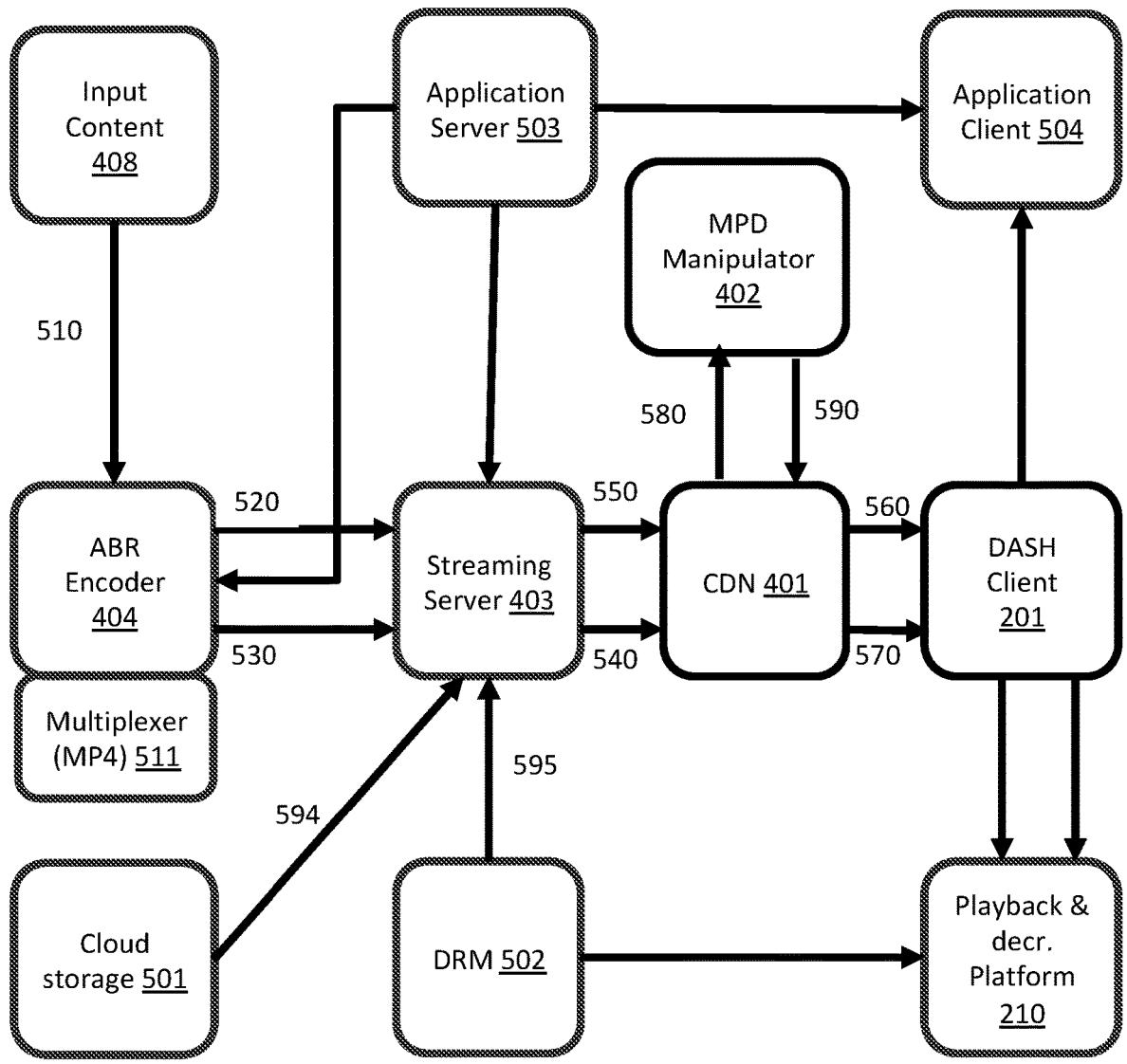
FIG. 5 illustrates an example MPEG-DASH packaging and encoding system deployed by a content or service provider in accordance with the embodiments.

In some embodiments, the streaming server 403 or ABR encoder 404 may be signalling the SCTE-35 command time_signal( ) or splice_insert explicitly in the MPEG-DASH media presentation description using the EventStream@Value attribute. In some embodiments, one or more of the client devices are an intermediate ad-insertion solutions; The one or more intermediate ad-insertion solutions inserting the alternate content in the MPEG-DASH Presentation description; The one or more intermediate ad-insertion solutions transmitting the MPEG-DASH presentation description to one or more additional client devices. FIG. 5 illustrates an example system-level and architecture diagram 500 of components that can be used to provide functionality in an environment such as those described with respect to FIGS. 1 and 2, as may be provided by the ABR encoder 404. In this example diagram 500, an ingest 510 is able to concurrently read from a set of SDI inputs by the ABR Encoder 404, here SDI inputs In1, In2, In3, and In4. The ingest 510 is also able to read a linear (or longitudinal) timecode (LTC) input, which can be monitored by a set of SDI readers. Each SDI input can have its own SDI reader in the ingest process 510. The data read from an SDI input can be directed to a process such as a live ABR Encoder 404. If the SDI input included SCTE-104 messages, then in at least some embodiments the SCTE-104 messages can be converted to SCTE-35 messages during the ingest process, as part of the overall encoding process at ABR Encoder 404. An SDI ingest reader encoder can ingest the SDI input data as if reading the data from the corresponding SDI input, and can provide that data to the corresponding encoding pipeline which can then output the media content through the corresponding audio, video, or media output. As mentioned, the encoding pipeline in at least some embodiments can be responsible for converting the SCTE-104 messages to SCTE-35 messages to be passed as part of the transport stream. The encoding pipeline can also cause at least a portion of the media content to be processed using a video encoding engine, which in at least some embodiments can be shared amongst the various encoding processes. In some embodiments the encoding engine is offered as a service to which various processes can subscribe. There can be multiple ABR Encoders 404 working in parallel, which can process different data packets or primary and backup copies of the packets, among other such options. The encoded streams with the SCTE-35 messages can be received to an ISO BMFF multiplexer 511, which can mux the streams into an appropriate metadata track or MPEG-DASH Event message in a file formatted according to the ISO Base media file format that can be forwarded to the appropriate client device, or other destination, for display or other such action. In some embodiments the encoding can occur in the ISOBMFF multiplexer as well.

Approaches in accordance with various embodiments can also provide for input failover. Using an input failover approach, if a process detects that a particular input is no longer available, the process can attempt to ingest from a different input instead. The failover should occur quickly in many instances, such that adding a handshake to shut down a monitoring daemon might not be practical given the complexity involved. The monitoring information can be reported up to a Web layer, for example, where a Rest API or other such interface can be exposed that can be queried by the customer. The Rest API response in some embodiments can list all the SDI inputs, along with audio/video format, loudness, input time code, and other such relevant information.

Accordingly, approaches in accordance with the various embodiments can enable the markers to be inserted at the appropriate locations during the encoding process by the ABR Encoder 404. A content provider, or other such entity, can utilize an API or other appropriate interface to specify a length of time, such as between 100 and 8,000 milliseconds, before the action frame at which to place the SCTE-35 marker. The SCTE-35 message can then be encoded into the stream at the appropriate location, which by the time codes will be placed the indicated amount of time before the inject point is located in the media stream. In the example of FIG. 3, the placing or pull-up of the SCTE-35 message can occur in the encode pipeline or in the ISO BMFF multiplexer, among other options. When the encoded stream is actually received by a downstream handler, for example, the hander can perform the content injection by recognizing the need for the injection, which can take a couple of seconds, preparing the content, which can take a few more seconds, then actually injecting the content.

It should be understood that in some embodiments these approaches can be used to increase the amount of pre-roll time applied for a given injection point. In some embodiments the process might allow for four seconds of pre-roll time by default. A particular provider might want to increase the amount of pre-roll time to a specified pre-roll time, such as to add another four to eight seconds or pre-roll time. Here, the additional four to eight seconds can be added. This approach can enable that additional amount of time to be added during the encode process such that the correct amount of pre-roll time is provided. This can help to ensure that when the multiplexer is doing interleaving of the appropriate packets, that the correct amount of content is buffered and that the interleaver has not already passed the appropriate point for the SCTE-35 marker such that the marker might simply be dropped or left out of the encoded media stream. The approach would apply to any SCTE-35 markers in the stream, whether related to injection points or various other tasks. And in at least some embodiments a specific pre-roll time can be applied for each transport stream output, such that different encodings could have different pre-roll times.

The Streaming server 403 is responsible for inserting the markers in the MPEG-DASH presentation, such as based on using MPD Events or the ISO BMFF track file output from the ABR encoder 404. In this case, a base64 encoding of the splice info section is applied and an event is created with a presentation time corresponding to the presentation time of the input marker on the MPEG-DASH timeline and the start of the splice. The EventStream element as defined in ISO/IEC 23009-1 is inserted in the MPEG media presentation description and the Event Element containing the base64 encoded splice info section. In some cases instead, of receiving the ISO BMFF track file from the ABR encoder, it is read from a cloud storage source 501 (as track file 594). A cloud storage source can be any resource in the cloud used for storing content such as object based cloud storage as provided for example by cloud services like Amazon s3, azure or Google cloud storage. In later stages, the Media presentation description and MPEG-DASH presentation description is communicated through Content Delivery Network (CDN) 401 and DASH Client 201. The DASH Client 201 can playback the streams via a playback and decryption platform such as for example based on W3C media source extensions or encrypted media extensions. An MPD Manipulator 402 can be setup by a third-party ad insertion provider or a dynamic ad insertion provider. It uses the signalling the MPD of the SCTE-35 signalling to insert advertisements at the right slots and/or replace advertisements by manipulating the Media presentation description. For example, the SCTE-35 marker embedded in the manifest as an Event can be used to identify ad periods and replace them accordingly with alternate content. The client would then receive the manipulated version of the 1MPD allowing it to playback the advertisement.

In some cases streams are encrypted and the client needs to obtain a license from the Digital rights management (DRM) system 502, which can be based on any of the commercial or non-commercial DRM providers. In these cases the streaming server is also responsible for embedding the DRM information in the streams.

The ABR Encoder 404 may use a protocol to send media segments/ingest 520 to the streaming server 403, the media ingest may be based on HTTP Live Streaming, Smooth Streaming, MPEG-DASH or CMAF or combinations. A best practice for this is also defined by the DASH-IF live media ingest protocol as published by the dash industry form. In this ingest, the ABR Encoder 404 uses HTTP POST requests to transmit media segments 520 to the streaming server 403. Such ingest may include a media ingest 520 and a timed metadata ingest 530 that contains information about the eventual splice points in the streams and injection points suitable for content replacement and/or insertion. Examples of timed metadata feeds for ingest may be based on timed metadata tracks such as defined in ISO/IEC 14496-12 section 12.3 or ISO/IEC 23001-18 using event messages. Other options are smooth streaming metadata tracks as defined in Microsoft Smooth Streaming or an ESAM/ESNI XML signal as defined by Society of Telecommunication Engineers. Sending such metadata 530 may be combined with the principal media ingest 520 in many practical embodiments. The Application Server 503 may be a separate entity or server that provides the higher level features and or control of the streaming setup, for example the application server 503 may host the web page and or application provided to a streaming client 504 and some programming and scheduling information. The application server 503 may have control over the ABR encoder 404 and streaming server 403 in order to fulfil streaming requirements for clients.

The input content 408 may be provided over an interface or protocol 510 that includes SDI based signals, MPEG-2TS based signals from a broadcast or other mezzanine forms such as based on RST (Reliable Secure Transport) as provided SRT foundation, or proprietary alternatives such as Zixi. or other popular protocols for raw ingest.

Other protocols used for ingest 520/530 from an encoder include RTMP as developed by Adobe systems and Azure live media ingest or smooth streaming ingest as developed by Microsoft. The DRM System 502 may exchange key information 595 to the streaming server 403, where a common protocol or format for this is Content Protection Interchange Format CPIX as developed by the DASH-IF and standardised by European Telecommunications Standards Institute (ETSI), such exchange of information includes encryption keys to enable the streaming server to do an encryption of the media content to be forwarded to the Content Delivery Network (CDN) 401. The exchange of media information 550 between the Streaming server 403 and the Content Delivery Network 401 may be based on MPEG-DASH, HTTP Live Streaming, Common Media Application Format, smooth streaming or any other poplar media streaming format readily available for client. In some embodiments as detailed herein, the MPEG-DASH media presentation can carry markers 540 for inserting supplemental content. In this case the Markers are either carried in the MPD as MPD event or in the media segment as DASHEventMessageBoxes. In this case the manifest as contained in 540 and 550 from the presentation or the playlist is shared with the MPD manipulator 402 via signal 580 and the MPD manipulator 402 returns a manipulated MPD signal 590 to the CDN 401 that can be sent as signal or manifest 560 in the MPEG-DASH presentation to the client 201. This streaming media presentation contains segments 570 and (manipulated) manifest 560, 590. Example of MPD manipulation include AWS Media Tailor as developed by AWS or Google Dynamic ad insertion as developed by Google. The DASH Client 201 may be embedded in an application client that could be any (interactive) television client 504 running ad insertion solutions. Examples include HbbTV clients running on smart TV's, android media clients running on any devices, PC apps running an application client 504 for receiving interactive television feeds, possibly enhanced with supplemental content.

Figure 6:
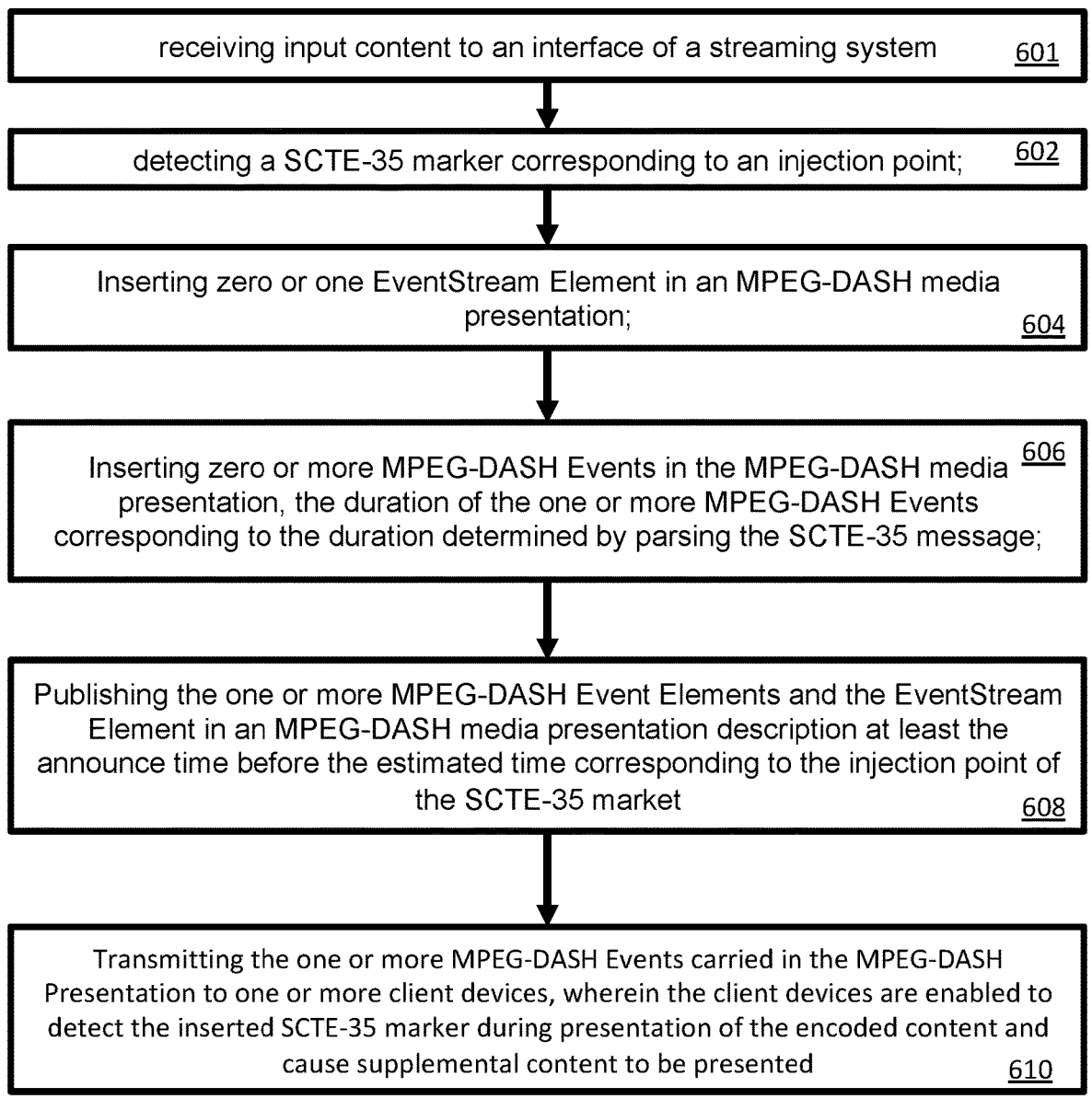
FIG. 6 illustrates exemplary steps involved with the disclosed methods for inserting markers in MPEG-DASH in accordance with the embodiments.

FIG. 6 illustrates steps in a method 600 for inserting markers in an MPEG-DASH presentation in accordance with the embodiments. The first step 601 involves receiving input content to an interface of a streaming system. In this case an HD-SDI, MPEG-2 TS or CMAF input is received on an interface. This interface could be an interface in a cloud such as the interface 301 (shown in FIGS. 3 and 4). Step 602 detects a SCTE-35 marker corresponding to an injection point. Typically this step would be detecting the SCTE-35 or SCTE 104 message and converting that to a SCTE-35 message. Next, at step 604, the method inserts one or more EventStream Element in an MPEG-DASH media presentation. In case the manifest already contains an EventStream Element, zero (no) new EventStream Element needs to be inserted. This would be followed by step 606 of inserting zero or more MPEG-DASH Events in the MPEG-DASH media presentation, the duration of the one or more MPEG-DASH Events corresponding to the duration determined by parsing the SCTE-35 message. In case the SCTE-35 message contains multiple descriptors this could lead to an Event being inserted with a matching duration for each distinct descriptor with a distinct duration. At step 608, the method publishes the one or more MPEG-DASH Event Elements and the EventStream Element in an MPEG-DASH media presentation description at least the announce time before the estimated time corresponding to the injection point of the SCTE-35 marker. Typically the Events are signalled in the manifest or as an inband event message in order that the client can receive the marker at least 4 seconds ahead of the actual presentation or presentation time. Finally, step 610 involves transmitting, possibly upon a client request, the one or more MPEG-DASH Events carried in the MPEG-DASH Presentation to one or more client devices, where the client devices are enabled to detect the inserted SCTE-35 marker during presentation of the encoded content and cause supplemental content to be presented. This implies that events can be either transmitted in the manifest presentation description or as part of segments such as using DASHEventMessageBox, or a timed metadata track such as a CMAF timed metadata track.

In other cases the method may include detecting if a SCTE-35 message with corresponding splice_event_id was already received. In such a case, if event_cancel_indicator was set to 1 this message can be considered to remove an event from a presentation, otherwise the SCTE-35 may be a repetition or update and can be ignored. An MPD validity expiration event as defined in MPEG-DASH ISO/IEC 23009-1 may be used to trigger clients to update their MPD. Further an 1MPD Event may be inserted corresponding to each descriptor and duration, using a combination of splice_event_id and or segmentation_event_id to derive the unique id of the event Event@id. Alternatively Event@id may be derived as a hash or checksum of the SCTE-35 marker message, such as based on CRC 32. This is useful in case a SCTE-35 marker with a cancel-indicator is 1 is received with identical splice_event_id, thus splice_event_id does not map directly to Event@id.

In some cases the base 64 encoding may be explicitly signalled by setting the contentEncoding Attribute in the Event@contentEncoding to base64, in other cases a schemeIdUri such as urn:scte:scte-35:2014:xml+bin may be used to explicitly indicate base64 encoded value of the event. In some cases the method includes converting the SCTE 104 message to SCTE-35 as described by communication standards such as SCTE 104. This is the case if the input content is HD-SDI and does not contain the SCTE-35 markers yet. For the rest of the steps, it does not make a big difference if these steps are included or not.

Figure 7:
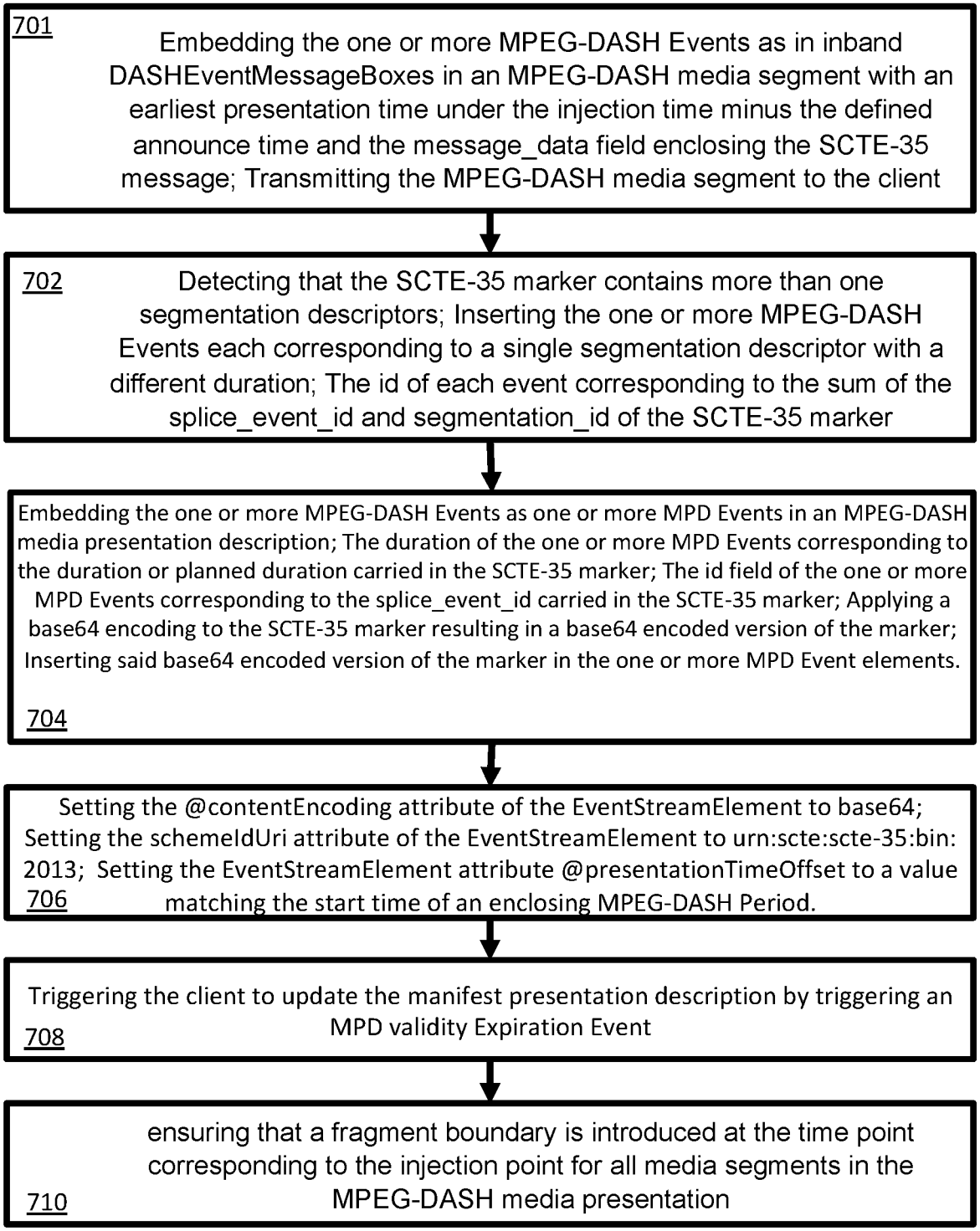
FIG. 7 illustrates exemplary steps involved with the disclosed methods for inserting markers in MPEG-DASH in accordance with the embodiment.

FIG. 7 illustrates additional steps in preferred embodiments of a method 700 for inserting SCTE-35 markers in MPEG-DASH media presentation descriptions. A common step 701 involves embedding the one or more MPEG-DASH Events such as inband DASHEventMessageBoxes in an MPEG-DASH media segment with an earliest presentation time smaller than the injection time minus the defined announce time and the message_data field enclosing the SCTE-35 message and Transmitting the MPEG-DASH media segment to the client. The benefit of enclosing the inband DASHEventMessageBoxes with a media segment smaller than the intended presentation time minus the predefined announce time (pre-roll) time is that clients can detect the marker sooner in the stream, at least before the target injection point.

Another step can further detect that the SCTE-35 marker has a event_cancel_indicator set to 1; in that case detecting if the Event with corresponding splice_event_id is not published in a segment or manifest, removing the Event from the MPEG-DASH media presentation is applied.

The method may also comprise detecting if the splice_event_id is identical to a splice_event_id in a previously received SCTE-35 marker or a currently active 1MPD Events; Detecting that the message payload is matching; Inserting zero or more MPD Events in the MPEG-DASH media presentation description. In case the event_cancel_indicator is not set to 1 this may indicate that the even is a duplicate repetition of the SCTE-35 marker, it is not necessary to convert it to MPD event and insert it in the MPEG-DASH manifest.

In preferred embodiments the streaming server or ABR encoder is receiving the input content as one of a CMAF Timed Metadata Track, an MPEG-2 Transport stream, a smooth streaming timed metadata track or an MPEG-DASH presentation or an HLS presentation. In a CMAF timed metadata track the emsg events may be enclosed in samples of the CMAF track and are accessible directly from the CMAF track In some embodiments, the method includes first detecting a SCTE-104 marker in the media content corresponding to the injection point; translating the SCTE-104 marker to the SCTE-35 marker. Especially in cases the input media is HD-SDI or other uncompressed format, SCTE 104 markers may be present. Without loss of generality these can be immediately converted to SCTE-35 markers.

The ABR encoder encountering a SCTE-35 message ensures that a fragment boundary is introduced at the time point corresponding to the injection point for all media segments in the MPEG-DASH media presentation. This implies inserting an IDR frame in a segment allowing a splice in to happen. This step may occur after first validating that a splice or SCTE-35 event is valid.

In preferred embodiments, the method includes analyzing a program clock reference (PCR) corresponding to the injection point and analyzing a presentation time stamp in the transport stream corresponding to the injection time. By analyzing a presentation time adjust field specified in the SCTE-35 marker and computing the Event Presentation Time based on these three different consistent MPEG-DASH times, times relative to a fixed anchor time can be computed.

The computer-implemented method may also include signalling the SCTE-35 command time_signal( ) or splice_insert explicitly in the MPEG-DASH media presentation description using the EventStream@Value attribute. The EventStream element allows for signalling subschemes in the EventStream@Value attribute and this attribute can be used to indicate if the markers are carrying time_signal or splice_insert messages.

In many embodiments, one of the one or more of the client devices are intermediate ad-insertion solutions; The one or more intermediate ad-insertion solutions inserting the alternate content in the MPEG-DASH Presentation description;

The one or more intermediate ad-insertion solutions transmitting the MPEG-DASH presentation description to one or more additional client devices. This can be achieved for example with an MPD manipulator that replaces periods matching the 1MPD Events carrying the SCTE-35 signals.

In some embodiments, the method 700 can further include at step 702 of detecting that the SCTE-35 marker contains more than one segmentation descriptors; Inserting the one or more MPEG-DASH Events each corresponding to a single segmentation_descriptor with a different duration; The id of each event corresponding to the sum of the splice_event_id and segmentation_id of the SCTE-35 marker, or in some cases it could be the checksum based on a CRC32 checksum of a message. This is useful for example for a cancelling marker with event_cancel_indicator set to 1. In this case the Event@id or emsg.id is different from the corresponding splice_event_id.

At step 704, the method can further embed the one or more MPEG-DASH Events as one or more MPD Events in an MPEG-DASH media presentation description; The duration of the one or more MPD Events corresponding to the duration or planned duration or segmentation_duration carried in the SCTE-35 marker; The id field of the one or more MPD Events corresponding to the splice_event_id carried in the SCTE-35 marker, or a checksum of the marker such as based on CRC32 in case of time_signal or when the marker contains a event_cancel_indicator (i.e. segmentation_event_cancel_indicator or splice_event_cancel_indicator flag is set); Applying a base64 encoding to the SCTE-35 marker resulting in a base64 encoded version of the marker; and Inserting said base64 encoded version of the marker in the one or more MPD Event elements.

At step 706, the method 700 can further include setting the @contentEncoding attribute of the EventStreamElement to base64; Setting the schemeIdUri attribute of the EventStreamElement to urn:scte:scte-35:bin:2013; and Setting the EventStreamElement attribute @presentationTimeOffset to a value matching the start time of an enclosing MPEG-DASH Period.

Step 708 can further trigger the client to update the manifest presentation description by triggering an MPD validity Expiration Event.

At step 710, the method ensures that a fragment boundary is introduced at the time point corresponding to the injection point for all media segments in the MPEG-DASH media presentation.

FIG. 8. Illustrates a sample signalling 800 of the EventStream in a Period element in an MPEG-DASH media presentation description. The schema is as defined in ISO/IEC 23009-1 and the period contains the EventStream. The EvenStream element can signal an @presentationTimeOffset which is 0 by default, a schemeIdUri is set to urn:scte:scte35:2014:xml+bin to indicate carriage of binary base64 encoded SCTE-35 markers. The Binary element contains the base64 encoded version of the element. In the method enclosed in this invention, the values for the Event@id are matching splice_event_id from the SCTE-35, however, in some cases, such as when using time_signal another method such as checksum calculation based or hash of the message data may be used to derive a unique 32-bit identifier, the CRC-32 checksum. This may also be the case if segmentation_event_cancel_indicator or splice_event_cancel_indicator is set, the event should use a crc 32 checksum instead as event id.

and the presentationTime need not to match the time from the SCTE-35 marker, in preferred embodiments the splice_immediate flag is set in the SCTE-35 marker and the timing from the Event element is leading.

Figure 9:
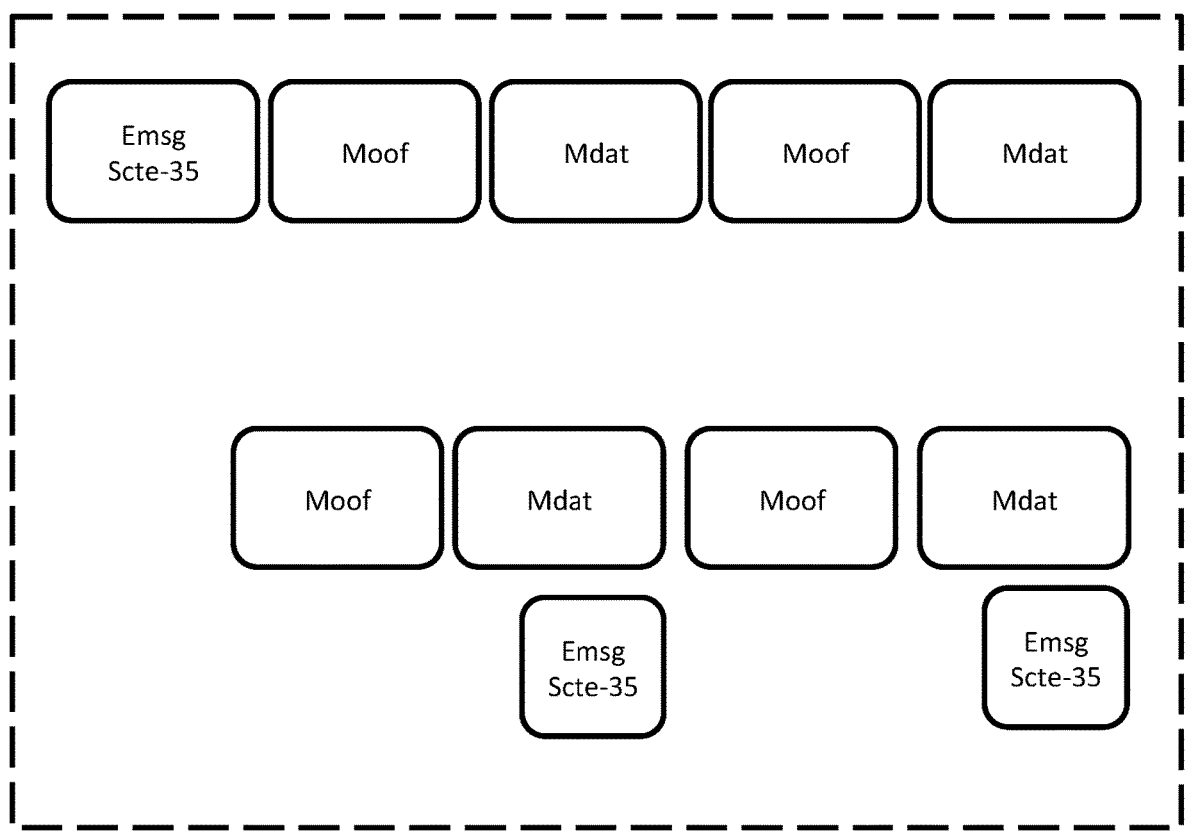
FIG. 9 illustrates an exemplary CMAF-Track with inband event messages inserted in accordance with the embodiments.

FIG. 9. Illustrates a sample signalling or data structure 900 of the inband DASHEventMessageBox in a CMAF Track in an MPEG-DASH presentation or CMAF Track file. In this case the DASHEventMessageBox encloses the splice info section in the message_data field. The emsg box is placed before any MovieFragmentBox ('moof') and after any MovieBox (moov) or mdat box. In same case event message instances may also be carried in a MovieDataBox, mdat in this case the SCTE-35 marker is carried as a timed metadata track. These tracks obey the CMAF track files as defined in Common Media Application Format (CMAF) in ISO/IEC 23000-19.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network, and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. The information processing systems contemplated herein include media streaming devices such as smart televisions, tablet computers, personal computers, media streaming servers, content delivery networks or other components with similar functionality for transmitting, receiving and processing of media streaming content. The media streaming device can also include a parser device which can include a device such as a file reader, java-script based parser, that can extract the ISO Base Media file Format structures to read them into the computer memory and use them for generating instructions for the processor. Again, a media streaming device as contemplated in various embodiments herein can be any device dealing with streaming media either actively or passively. They could be origin servers or packagers that are used for formatting live encoded media, or alternatively embedded in devices such as smart phones, televisions, ipads, or other consumer electronics receiving the track for rendering the media presentation, TV Channel or any other associated media tracks. As noted previously, the data processing can be any number of data processing techniques suited for the identifying, enclosing, storing, transmitting, receiving, formatting, converting, multiplexing, de-multiplexing, slicing, presenting, providing controlled access or authentication, tracking, logging or counting or any other function contemplated herein in any setting or environment.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

As shown in FIG. 9, an information processing system 101 of a system 200 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 200. The data processing module 150 can be coupled to one or more sensors 152 as needed. Such sensors can be timers, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 200, can use the information from the history log such as in the analysis process and in making decisions related methods disclosed herein.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 200 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-8 illustrate examples of systems, data formats, methods or process flows, according to various embodiments of the present disclosure, which can operate in conjunction with the information processing system 200 of FIG. 9.

What is claimed is:

1. A computer-implemented method, comprising: receiving input content to an interface of a streaming system; detecting a SCTE-35 marker corresponding to an injection point; inserting at least one or more EventStream Elements in an MPEG-DASH media presentation; inserting at least one or more MPEG-DASH Events in the MPEG-DASH media presentation, the duration of one or more MPEG-DASH Events corresponding to a duration determined by parsing an SCTE-35 message and the presentation_time of the MPEG-DASH Events corresponding to the injection point; publishing an MPEG-DASH media presentation description at least an announce time before an estimated time corresponding to the injection point of the SCTE-35 marker; transmitting the one or more MPEG-DASH Events carried in the MPEG-DASH media presentation to one or more client devices, wherein the one or more client devices are enabled to detect the inserted SCTE-35 marker during presentation of an encoded content of the MPEG-DASH media presentation and cause supplemental content to be presented; an presenting the encoded content of the MPEG-DASH media presentation and the supplemental content.

2. The computer-implemented method of claim 1, further comprising:
   embedding the one or more MPEG-DASH Events as inband DASHEventMessageBoxes in an MPEG-DASH media segment with an earliest presentation time smaller than the injection time minus a defined announce time and a message_data field enclosing the SCTE-35 message; and
   transmitting the MPEG-DASH media segment to the one or more client devices.

3. The computer-implemented method of claim 1, further comprising: detecting that the SCTE-35 marker contains more than one segmentation descriptor; and inserting the one or more MPEG-DASH Events each corresponding to a single segmentation descriptor with a different duration.

4. The computer-implemented method of claim 1, further comprising: embedding the one or more MPEG-DASH Events as one or more media presentation description (MPD) Events in an MPEG-DASH media presentation description where a duration of the one or more MPD Events corresponding to the duration carried the SCTE-35 marker; applying a base64 encoding to the SCTE-35 marker resulting in a base64 encoded version of the marker; detecting the SCTE-35 marker contains a splice_insert( ) command; computing an id field of the one or more MPD Events corresponding to a splice_event_id carried in the SCTE-35 marker if it contains a splice_insert( ) command; and inserting the base64 encoded version of the marker in the one or more MPD Event elements.

5. The computer-implemented method of claim 4, the method further comprising: setting an @contentEncoding attribute of an EventStreamElement to base64; setting a schemeIdUri attribute of the EventStreamElement to urn:

scte:scte-35:bin:2013; and setting an EventStreamElement attribute @presentationTimeOffset to a value matching a start time of an enclosing MPEG-DASH Period.

6. The computer-implemented method of claim 4, further comprising:
triggering the one or more client devices to update a manifest presentation description by triggering an MPD validity Expiration Event.

7. The computer-implemented method of claim 1, further comprising:
The method of 4 also detecting that the SCTE-35 marker carries a time_signal command; computing the id field of the MPD event by computing a checksum of the SCTE-35 marker.

8. The computer-implemented method of claim 4, further comprising: detecting when the splice_event_id or a segmentation_event_id is identical to a previously received SCTE-35 marker or a currently active MPD Events; detecting that the SCTE-35 marker is identical; when the marker is not identical check if the segmentation_event_cancel_indicator or splice_event_cancel_indicator flag is set; when the flag is set when the marker is not identical remove the currently active MPD event from the manifest presentation description.

9. The computer-implemented method of claim 1, further comprising receiving the input content as one of a CMAF Timed Metadata Track, an MPEG-2 Transport stream, a smooth streaming timed metadata track, an MPEG-DASH presentation, or an HLS presentation.

10. The computer-implemented method of claim 1, further comprising:
first detecting a SCTE-104 marker in a media content corresponding to the injection point; and
translating the SCTE-104 marker to the SCTE-35 marker.

11. The computer-implemented method of claim 1, further comprising:
ensuring that a fragment boundary is introduced at the time point corresponding to the injection point for all media segments in the MPEG-DASH media presentation; and
detecting that a corresponding instantaneous decoder refresh (IDR) frame is present for all media segments in the MPEG-DASH media presentation.

12. The computer-implemented method of claim 1, further comprising:
analyzing a program clock reference (PCR) corresponding to the injection point;
analyzing a presentation time stamp in the transport stream corresponding to the injection point;
analyzing a presentation time adjust field specified in the SCTE-35 marker; and
computing the Event Presentation Time based on the PCR, the presentation time stamp, and the presentation time adjust field relative to a fixed anchor time.

13. The computer-implemented method of claim 1, further comprising signalling a SCTE-35 command time_signal( ) or a splice_insert( ) explicitly in the MPEG-DASH media presentation description using an EventStream@Value attribute.

14. The computer-implemented method of claim 1, further comprising:
wherein one of the one or more of the client devices are intermediate ad-insertion solutions and the one or more intermediate ad-insertion solutions insert alternate content in the MPEG-DASH Presentation description; and
wherein the one or more intermediate ad-insertion solutions transmit the MPEG-DASH presentation description to one or more additional client devices.

15. A system, comprising: at least one or more processors; and memory including instructions that, when executed by the system, cause the system to: receive input media content to an interface of a streaming system; determine an injection point of a video portion of the input media content; determine a return point of a video portion of the input media content and a segmentation duration; insert one or more MPEG-DASH Events in an MPEG-DASH media presentation; wherein the system publishes an Event presentation time matching a time of the injection point in a media presentation description, at a time corresponding to an announce time of at least 4 seconds before a corresponding media segment; and transmitting the MPEG-DASH media presentation via one or more electronic devices to be received by an electronic device.

16. The system of claim 15, wherein the instructions when executed further cause the system to:
detect a SCTE-35 marker in the input media content corresponding to the injection point; and
detect a duration and an out point; and
translate the SCTE-35 marker to an MPEG-DASH Event with a presentation time corresponding to the injection point.

17. The system of claim 15, wherein the instructions when executed further cause the system to:
detect a SCTE-104 marker in the input media content corresponding to the injection point; and
translate the SCTE-104 marker to an SCTE-35 marker.

18. The system of claim 15, wherein the instructions when executed further cause the system to:
ensure that a fragment boundary is encoded into the corresponding media segments at the injection point such that any frames of video content located subsequent an instantaneous decoder refresh (IDR) frame do not refer to video frames prior to the fragment boundary in the media content; and
ensure that the fragment boundary is encoded into the media segments at the return point such that any frames of video content located subsequent the IDR frame do not refer to video frames prior to the fragment boundary in the media content.

19. The system of claim 15, wherein the instructions when executed further cause the system to:
analyze a program clock reference (PCR) to determine a time of the injection point;
analyze a presentation time stamp in a transport stream, and a presentation time specified in the SCTE-35 marker; and
compute an Event Presentation Time based on the PCR, the time of the injection point, the presentation time stamp, and the time specified in the SCTE-35 marker relative to a fixed time anchor.

20. The system of claim 15, wherein the instructions when executed further cause the system to:
separate the input media content, received at the interface of an encoding system of the streaming system into individual streams including a video stream portion, an audio stream portion, and a data stream portion; and
multiplex the video stream portion, the audio stream portion, and the data stream portion to generate the input media content in an output format for each portion.

* * * * *